United States Patent
Gladd et al.

(10) Patent No.: US 6,360,438 B1
(45) Date of Patent: Mar. 26, 2002

(54) METHOD OF MAKING AN UPPER HOUSING FOR A BUSSED ELECTRICAL CENTER

(75) Inventors: Joseph Howard Gladd, Cortland; Jeffrey Michael Hickox, Middlefield, both of OH (US); Andrew F. Rodondi, Sharpsville, PA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/696,704

(22) Filed: Oct. 25, 2000

Related U.S. Application Data

(62) Division of application No. 09/447,969, filed on Nov. 23, 1999.

(51) Int. Cl.[7] ............................................... H01R 43/00
(52) U.S. Cl. ............................ 29/883; 29/874; 29/876; 29/882; 439/364
(58) Field of Search ........................ 29/883, 884, 876, 29/882, 874; 439/364

(56) References Cited

U.S. PATENT DOCUMENTS

| | | |
|---|---|---|
| 2,669,702 A | 2/1954 | Klostermann |
| 3,571,779 A | 3/1971 | Collier |
| 4,473,267 A | 9/1984 | Sadigh-Behzadi |
| 4,664,461 A | 5/1987 | Schubert et al. |
| 4,764,645 A * | 8/1988 | Takasawa ................... 29/883 |
| 4,824,390 A | 4/1989 | Crane et al. |
| 5,017,153 A | 5/1991 | Bowman |
| 5,227,955 A | 7/1993 | Le Bris et al. |
| 5,253,143 A | 10/1993 | Klinger et al. |
| 5,254,018 A | 10/1993 | Sawada |
| 5,279,030 A * | 1/1994 | Ito et al. ........................ 29/883 |
| 5,764,487 A | 6/1998 | Natsume |
| 5,777,850 A | 7/1998 | Jakob et al. |
| 5,782,651 A | 7/1998 | Konoya |
| 5,822,855 A * | 10/1998 | Szczesny et al. |
| 6,126,458 A * | 10/2000 | Gregory, II et al. |

OTHER PUBLICATIONS

IEEE Trans Components, Packaging and Manufacturing Technology–Part B vol. 18, No. 2 May 1995 pp 235–239 by Steven D. Roobinson et al.*

* cited by examiner

*Primary Examiner*—Carl J. Arbes
(74) *Attorney, Agent, or Firm*—Thomas A. Twomey

(57) ABSTRACT

An environmentally protected (sealed) BEC (10) at the upper and lower housing seams (16u, 16l) and at each of the connector receptacle (18a, 18b, 18c). A lower housing (14) of the BEC is formed conventionally, as for example by plastic injection molding and may carry a printed circuit board (PCB) (70), a spacer plate (72) and an electrical assemblage (74) including upstanding blade terminals (76). An upper housing (14) of the BEC is formed in two shots. Firstly, an upper housing body (14b) is formed by a plastic injection molding process using a first upper mold member (42) mated to a lower mold member (44). Next, the first upper mold member is removed, and a second upper mold member (52) is mated to the lower mold member. A liquid injection molding process now injects a resilient seal (silicone) over all mating surfaces of the upper housing body, including the upper housing seam (16u) and each connector receptacle.

1 Claim, 3 Drawing Sheets

METHOD OF MAKING AN UPPER HOUSING FOR A BUSSED ELECTRICAL CENTER

This is a division of application Ser. No. 09/447,969 filed on Nov. 23, 1999.

TECHNICAL FIELD

The present invention relates generally to an environmentally protected bussed electrical center, and further to a method of fabricating same.

BACKGROUND OF THE INVENTION

A bussed electrical center (hereinafter referred to simply as a "BEC") is a stand-alone central junction block assembly which has gained increasing applications in the automotive arts as motor vehicles become ever more electronically sophisticated. A BEC packages, for example, various fuses, relays and electronic devices in a single central location. A BEC not only saves cost by consolidating electrical interconnections, it also advantageously reduces the number of cut and spliced leads, thereby increasing reliability. An example of a BEC construction is described in U.S. Pat. No. 5,715,135, to Brussalis et al, dated Feb. 3, 1998.

What remains needed in the art is a BEC in which connections and seams are environmentally sealed.

SUMMARY OF THE INVENTION

The present invention is an environmentally protected (sealed) BEC at the housing seam and at each of the connector receptacles.

The lower housing is formed conventionally, as for example by plastic injection molding of a plastic lower housing body, and may carry a printed circuit board (PCB), a spacer plate and an electrical assemblage including upstanding blade terminals.

The upper housing is formed according to the method of the present invention, in two shots. Firstly, an upper housing body is formed by a plastic injection molding process using a first upper mold member mated to a lower mold member. Next, the first upper mold member is removed, and a second upper mold member is mated to the lower mold member. A liquid injection molding process now injects liquid resilient seal material, preferably silicone, over exposed surfaces of the upper housing body, including the upper housing seam and each connector interface. The liquid then solidifies adheringly to the exposed surfaces of the upper housing body so as to provide a resilient seal thereat.

Accordingly, it is an object of the present invention to provide an environmentally protected BEC via a method which includes a two shot injection process.

This, and additional objects, advantages, features and benefits of the present invention will become apparent from the following specification.

DESCRIPTION OF THE PREFERRED EMBODIMENT

Figure 1:
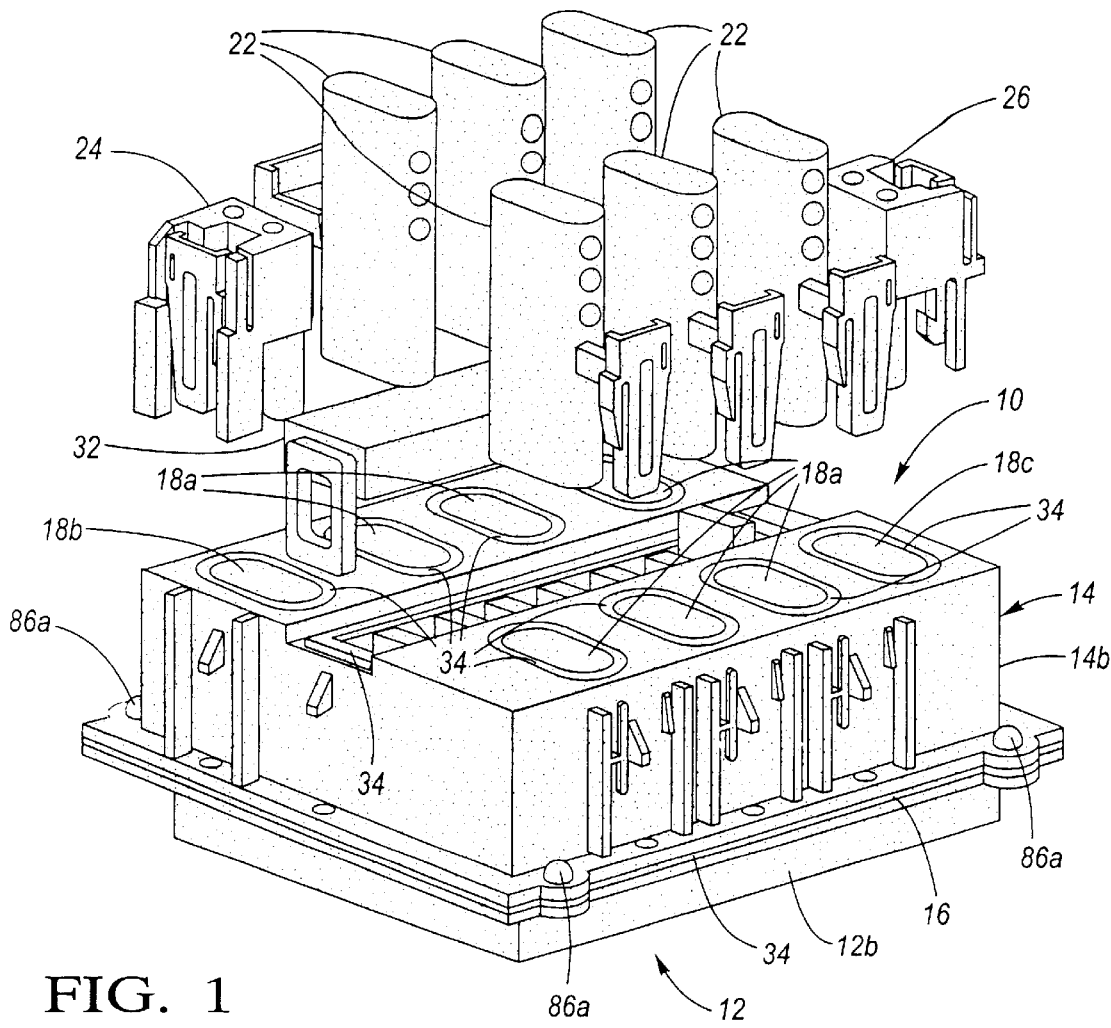
FIG. 1 is a perspective view of the environmentally protected BEC according to the present invention, including views of various connectors for interfacing therewith.

Referring now to the Drawings, FIG. 1 shows an environmentally protected bussed electrical connector 10 according to the present invention, hereinafter simply referred to as a "BEC". The BEC 10 includes a lower housing 12 and an upper housing 14 which are mated at a housing seam 16 including mating upper and lower housing seams 16u, 16l. The upper housing 14 includes a plurality of connector receptacles, as for example connector receptacles 18a 18b, 18c for receiving respectively therein prior art connectors in the form of: low cost buss (LCB) connectors 22, fiber optic connector 24, and "630" power connector 26. In addition, the upper housing has a fuse bay 28 (see FIG. 2A), the perimeter of which having a cover seam 30 (see FIG. 2A) for accepting a fuse cover 32. The lower housing 12 is composed of a plastic lower housing body 12b, whereas the upper housing 14 is composed of a plastic upper housing body 14b and includes at every location that the BEC 10 is seamed or opened, a resilient seal 34, wherein the preferred resilient seal material is silicone.

Figure 2A:
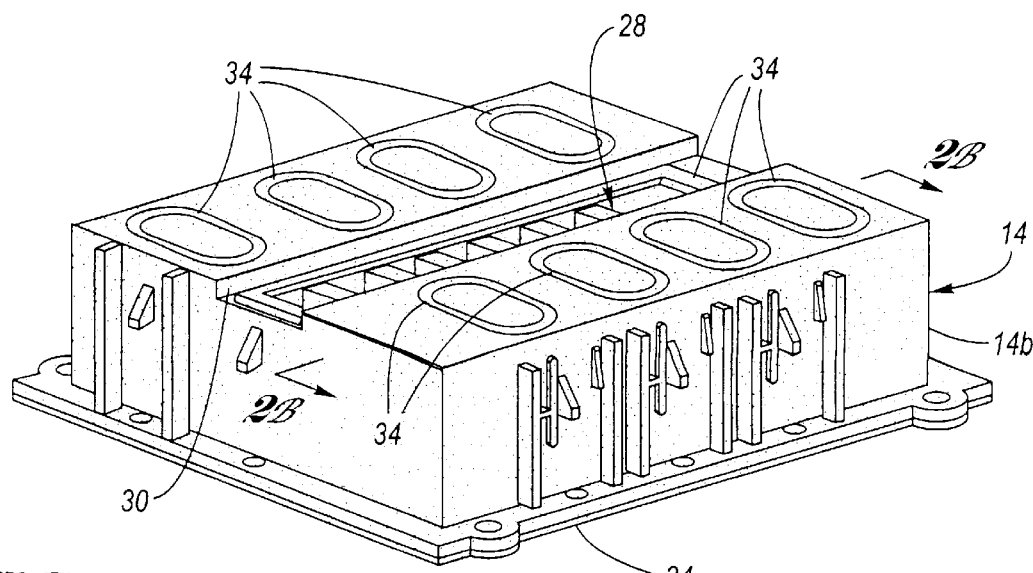
FIG. 2A is a perspective view of an upper housing of the environmentally protected BEC according to the present invention.
Figure 2:
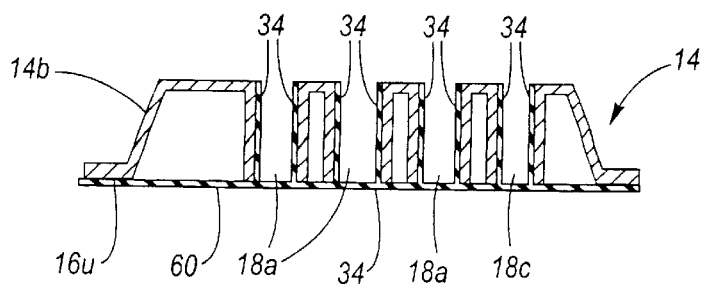
FIG. 2B is a sectional view of the upper housing, seen along line 2B—2B of FIG. 2A.
Figure 3:
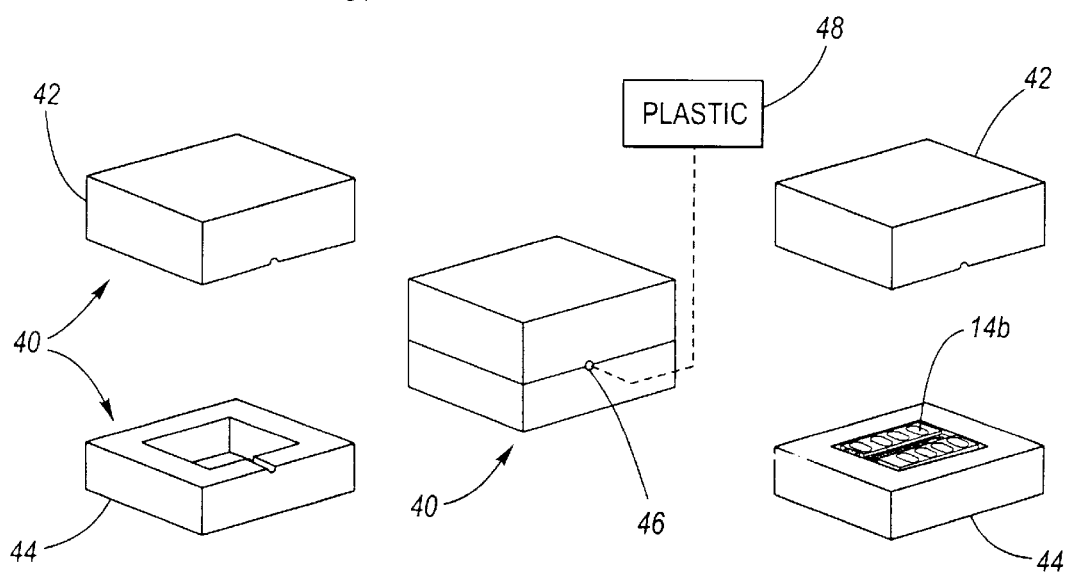
FIGS. 3A through 3C are schematic views of a first shot injection process of forming the upper housing.
Figure 4:
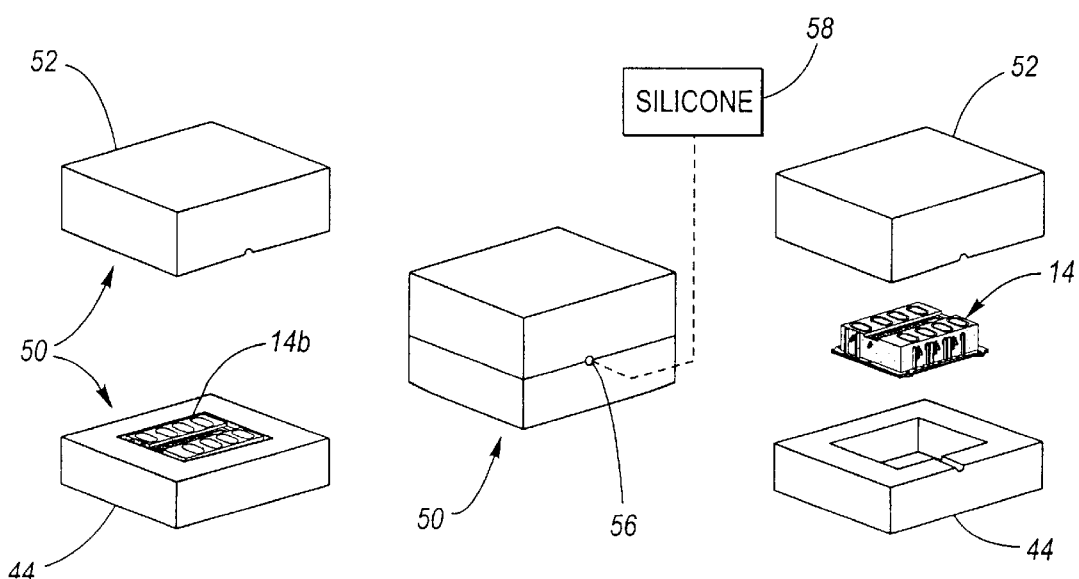
FIGS. 4A through 4C are schematic views of a second shot injection process of forming the upper housing.

Referring now to FIGS. 2A and 2B, it is seen that the resilient seal 34 is adhered to selected surfaces of the upper housing body 14b so as to cover each connector receptacle 18a, 18b, 18c, the upper housing seam 16u, and the cover seam 30. The resilient seal 34 serves to abut in sealing relation any received connector (as for example connectors 22, 24, 26, the fuse cover 32, and the lower housing seam 16l (see FIG. 5). Accordingly, the resilient seal 34 seals each and every potential location at which environmental intrusion into the BEC 10 could occur, as for example preventing entry of water, oils, and solvents, as well as oxidizing agents including gas exchange of atmospheric oxygen. As a result, the components within the BEC 10 remain in like-new condition, without environmental degradation over a scale of time vastly increased over a conventional bussed electrical center without the aforesaid resilient seal 34.

The lower housing 12 is provided preferably by a conventional plastic injection molding process. The upper housing 14 is provided, according to the present invention, by a two shot injection process schematically depicted at FIGS. 3A through 4C.

Referring to FIGS. 3A through 3C, a first shot injection process to fabricate the upper housing body 14b is depicted. At FIG. 3A, a plastic injection mold 40 is provided, including a first upper mold member 42 and a lower mold member 44. The first upper mold member 42 and the lower mold member 44 have an internal pattern (visible in the lower mold member) which provides the structural configuration of the upper housing body 14b. At FIG. 3B the first upper mold member 42 and the lower mold member 44 are mated and plastic is injected into a sprue 46 of the plastic injection mold 40, via a plastic injection apparatus 48. Next, at FIG. 3C, the first upper mold member 42 is separated from the lower mold member 44, the solidified upper housing body 14b being visible.

Referring now to FIGS. 4A through 4C, a second shot injection process to apply the resilient seal 34 to selected surfaces of the upper housing body 14b is depicted. At FIG. 4A, a liquid injection mold 50 is provided, including a second upper mold member 52 and the same lower mold member 44. The second upper mold member 52 has an internal pattern which provides appropriate flow tunnels, voids, and surfaces required to apply injected liquid to each of the resilient seal 34 locations mentioned hereinabove. At FIG. 4B the second upper mold member 52 and the lower mold member 44 are mated and liquid silicone is injected into a sprue 56 of the liquid injection mold 50, via a liquid injection apparatus 58. As liquid silicone injects, it adheres to the exposed surfaces of the upper housing body 14b so as to cover each connector receptacle 18a, 18b, 18c, the cover seam 30, and the upper housing seam 16u, wherein, preferably, a seal layer 60 of silicone is formed planarly across the upper housing body 14 at the upper housing seam (see FIG. 2B). To accommodate injection of liquid silicone at the seal layer 60, the second upper mold member 52 relaxes internally to allow the upper housing body 14 is rise out from the lower mold member 44. As the liquid silicone solidifies adheringly to the exposed surfaces of the upper housing body, it forms a resilient seal. The second upper mold member 52 and lower mold member 44 are opened and the upper housing 14 is ejected, as shown at FIG. 4C.

By way of example, the resilient seal 34, in the form of silicone, may have the following thicknesses: about one to two millimeters thick at the cover seam 30, about four to five millimeters thick at the connector receptacles, and about two millimeters thick at the seal layer 60.

Figure 5:
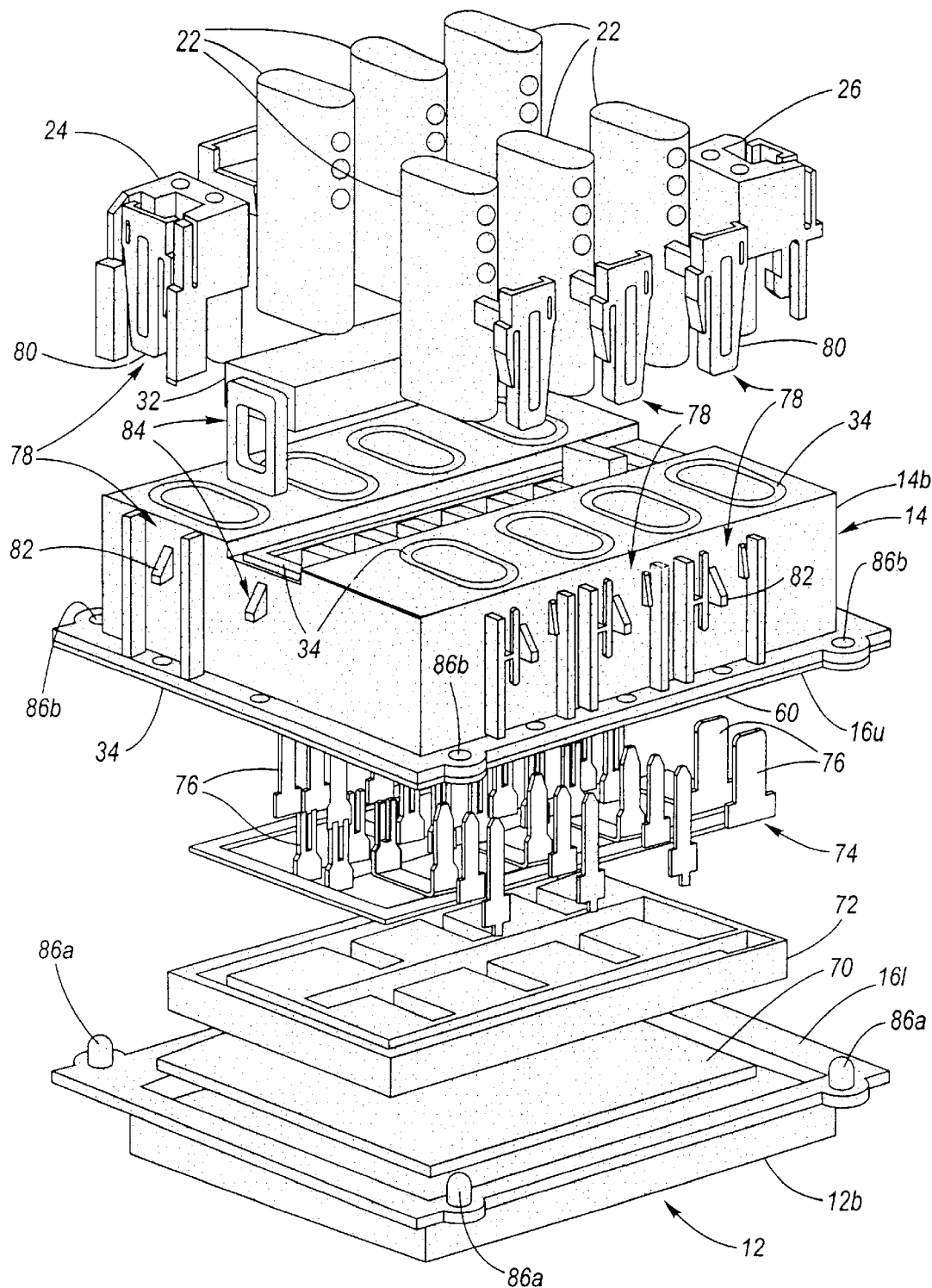
FIG. 5 is an exploded perspective view of the environmentally protected BEC, including views of various connectors for interfacing therewith.

FIG. 5 is a depiction of a typical operative configuration of the BEC 10, wherein a PCB 70, a spacer 72 and an electrical buss 74 having a plurality of upstanding blade terminals 76 are associated with the lower housing body 12b. As the upper housing seam 16u is interfaced with the lower housing seam 161, the seal layer 60 is pierced locally by the blade terminals 76, and the housing seal is made environmentally tight by periodically spaced connection studs 86a inserting into connection holes 86b. Lastly, the aforesaid connectors 22, 24, 26 are inserted into their respective connector receptacles 18a 18b, 18c and sealingly seated therein by the resilient seal 34. In this regard, a connector placement assurance (CPA) 78 is provided for each connector in the form of a resilient finger 80 on each connector engaging with a sloped tab 82 of the upper housing body 14b. Similarly, the fuse cover is held sealingly in place over the fuse bay by a similarly configured cover position assurance 84.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A method for providing an upper housing for an environmentally sealed bussed electrical center, comprising the steps of:

injecting plastic into a first mold to provide an upper housing body; and injecting liquid seal material into a second mold to provide a resilient seal covering selected portions of the upper housing body;

wherein said liquid seal material solidifies adheringly upon exposed surfaces of said upper housing body and thereby forms a resilient seal thereat;

wherein said first step of injecting further comprises:
    providing a first upper mold member having a first predetermined pattern thereinside;
    providing a lower mold member having a second predetermined pattern thereinside; and
    mating the first upper mold member to the lower mold member to provide said first mold; and wherein said second step of injecting further comprises:
    removing said first upper mold member from mating with said lower mold member;
    providing a second upper mold member having a third predetermined pattern thereinside; and
    mating the second upper mold member to the lower mold member to provide said second mold.

* * * * *